United States Patent

[11] 3,598,974

[72] Inventor Andrew James Lincoln
 Concord, Mass.
[21] Appl. No. 667,995
[22] Filed Sept. 15, 1967
[45] Patented Aug. 10, 1971
[73] Assignee Sperry Rand Corporation

[54] PROGRAMMABLE DIGITAL DIFFERENTIAL ANALYZER INTEGRATOR
 22 Claims, 18 Drawing Figs.

[52] U.S. Cl. .................................................. 235/150.31
[51] Int. Cl. .................................................. G06f 15/06,
 G06g 7/62
[50] Field of Search .......................................... 235/152,
 156, 150.31

[56] References Cited
 UNITED STATES PATENTS
3,050,251 8/1962 Steele ........................... 235/152 X
3,221,153 11/1965 Weighton ..................... 235/152

OTHER REFERENCES

Braun, " Design Features Of Current Digital Differential Analyzers" IRE Convention Record Part IV, 1954 pp 87—97

Owen, " The Differential Analyzer And Its Realization In Digital Form" Parts I & II, and " Corsair- A Digital Differential Analyzer" Electronic Engineering Vol. 32 Oct., Nov., & Dec. 1960, respectfully and pp. 614— 617, 700—704, & 740— 745, respectfully Primary Examiner—Eugene G. Botz
Assistant Examiner—David H. Malzahn
Attorney—S. C. Yeaton ABSTRACT: A programmable digital differential analyzer integrator which contains storage and logic circuits for changing its effective interconnections with other similar units merely by changing the information temporarily stored therein.

PATENTED AUG 10 1971 3,598,974

INVENTOR.
ANDREW JAMES LINCOLN
BY
*H P Terry*
ATTORNEY

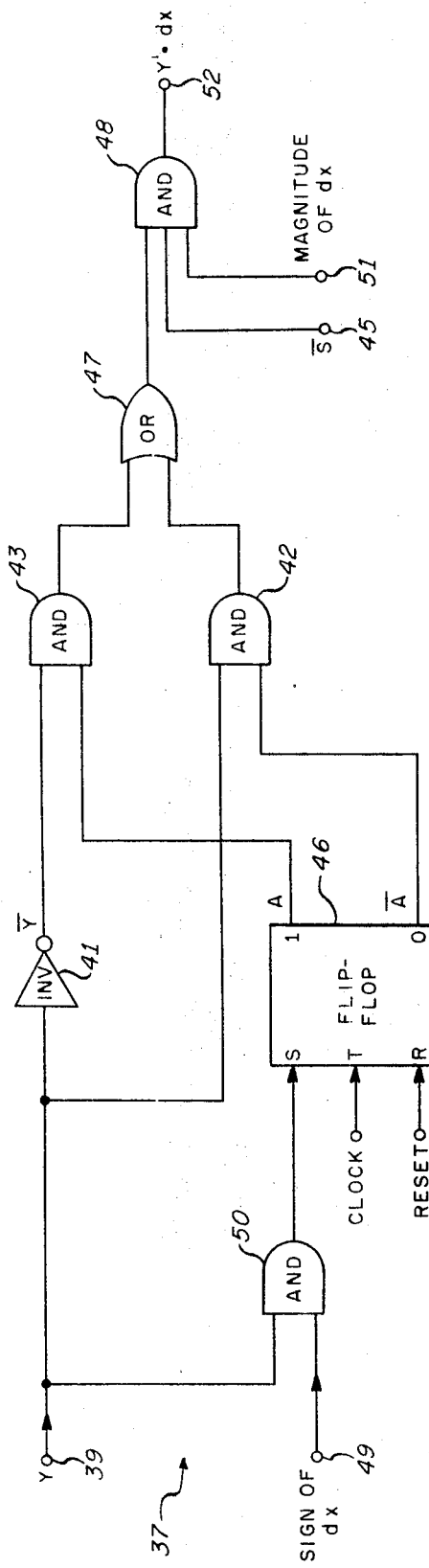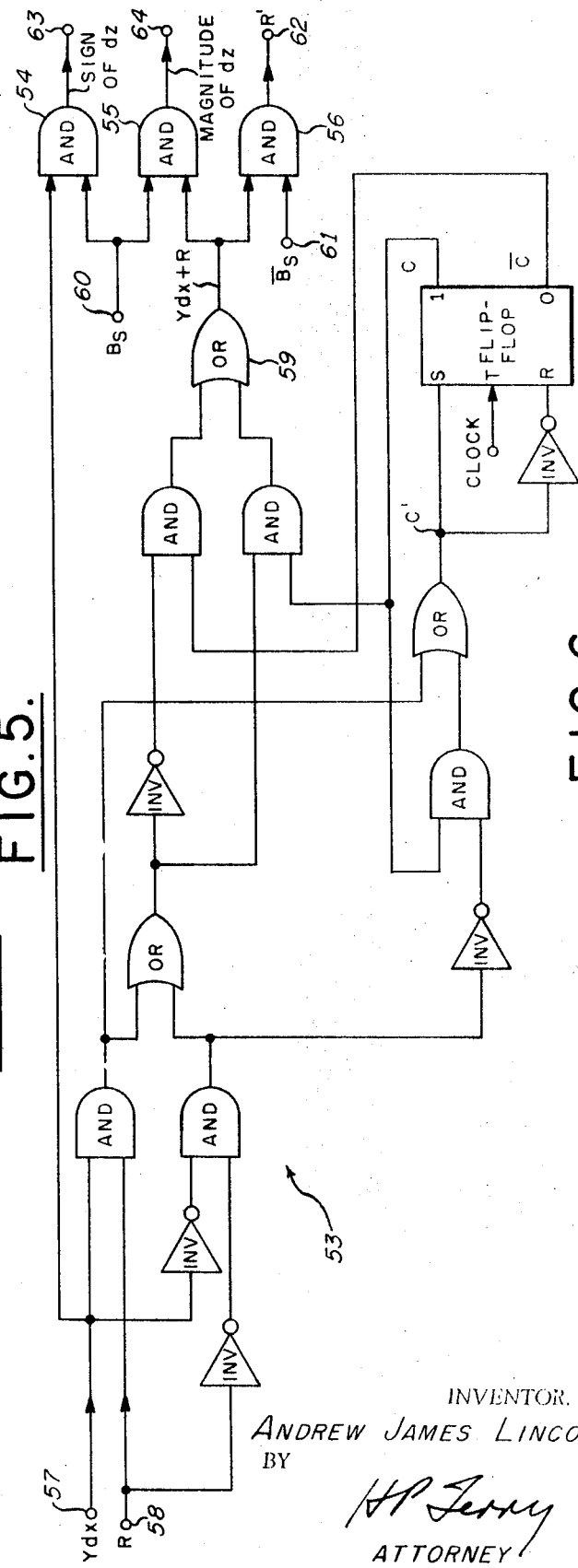
FIG.5.
FIG.6.

INVENTOR.
ANDREW JAMES LINCOLN
BY
ATTORNEY

INVENTOR.
ANDREW JAMES LINCOLN

PROGRAMMABLE DIGITAL DIFFERENTIAL ANALYZER INTEGRATOR

BACKGROUND OF THE INVENTION

1. Field of the Invention

This invention relates to digital differential analyzers and more particularly to digital differential analyzer integrators which are programmable.

2. Description of the Prior Art

Prior art computers utilizing digital integrators are known wherein a number of integrators are physically interconnected to produce the solution to a particular problem. Computers which employ digital integrators are particularly useful in the solution of differential equations and are known as digital differential analyzers which henceforth will be abbreviated DDA. An explanation of the theory and operation of the DDA is provided in U.S. Pat. Nos. 2,841,328, 2,850,232 and 2,900,134. The aforementioned patents disclose interconnecting networks of integrators to form DDA's, each of which solves a particular problem.

Recent advances in the fabrication of large integrated arrays favor utilization of the DDA particularly for aerodynamic applications as navigation, guidance and control computers. Primarily this is because the basic unit from which the DDA is formed, i.e., the integrator, is both well-clustered and standardized. In the present sense, well-clustered means that although there is high connectivity of logic circuits within the integrator, there are but few signal paths leading outside the integrator unit. Further, in the present sense, standardized means that only one or relatively few different types of elements are used repetitively to form the entire computer. Clustering is an important consideration when a computer system is to be formed from integrated semiconductor arrays since the number of leads which may be attached to a semiconductor element varies as the circumference of the element whereas the number of logic circuits which may be deposited on a substrate depends directly upon the area. Standardization is also an important consideration since the fewer different circuit types employed in a system and the greater the general usefulness of the elements employed, the lower the cost of the system.

Another problem which arises is that, particularly in aerodynamic applications, the dynamic conditions change rapidly and it may be desirable to change modes of operation in accordance with the varying conditions. Further, there may be several different phases to the solution that require different integrator configurations at different times which could not be readily programmed in the prior art devices. Another common problem in prior art systems is that certain portions of the computation may be better suited to whole number calculations than to the incremental techniques utilized in DDA's and they lack a simple method of interrelating these quantities.

SUMMARY OF THE INVENTION

The present invention pertains to a programmable DDA integrator that may be constructed as a single integrated circuit which preferably contains internally the storage and logic circuits for changing its effective interconnection with other similar units merely by changing the information temporarily stored within it. This may provide a programmable DDA integrator on a single semiconductor substrate which is both well-clustered and standardized. Further, little additional circuitry is required extending from the programmable DDA integrator of the present invention and the number of signals entering and exiting the integrator of the present invention is not significantly greater than it would be without the programmable feature. In addition, the integrator configuration of the present invention permits total programmability of the interconnections of separate units while also allowing for efficient DDA communication with, and control by, a whole number digital computer. The present invention is particularly well adapted to be fabricated as a single chip and being both well-clustered and standardized, it overcomes the disadvantages of the prior art devices.

BRIEF DESCRIPTION OF THE DRAWINGS

Referring to the drawings:

FIG. 5 is a schematic diagram of a $Y$–$dX$-multiplier;

FIG. 6 is a schematic diagram of a serial adder with a $dZ$-output;

DESCRIPTION OF THE PREFERRED EMBODIMENT

A DDA is a computer which may be used to solve ordinary differential equations or other equations which can be written in differential form. The basic computing elements of DDA's are called "integrators" and provide a digital approximation to Stieltjes integration. Solutions are obtained by interconnecting integrators, either physically or functionally, in a manner similar to that employed with analog differential analyzers.

Figure 1:
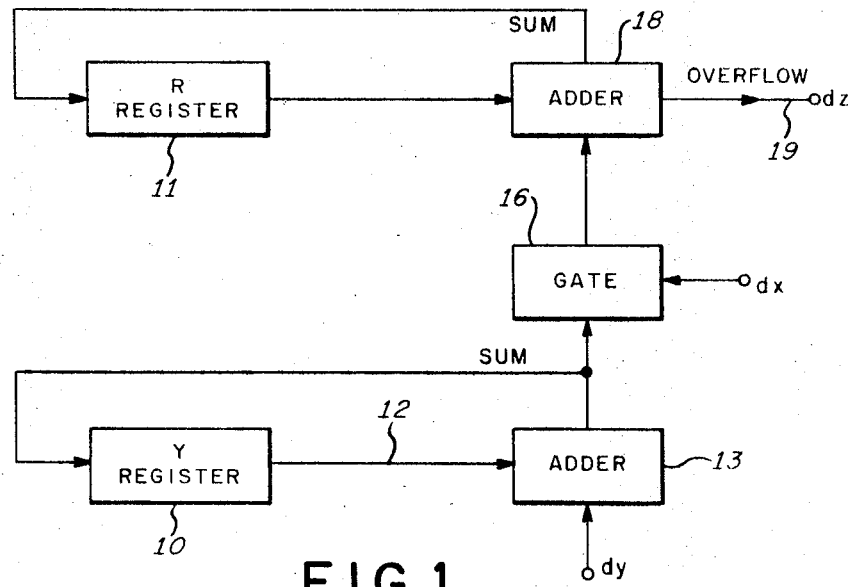
FIG. 1 is a schematic block diagram showing a typical DDA-integrator.

Referring to FIG. 1 which shows a block diagram of a typical DDA-integrator, two storage registers 10 and 11 are used to store, in digital form, the quantities Y and R respectively. The output of the Y-register 10 connects to the input of a digital adder 13 which receives as its other input the quantity $dY$ which represents the incremental change in Y. During an updating cycle $dY$ is added to Y, and the resulting sum is returned to form the new value of Y. This sum is also delivered to a gate 16 for possible addition to or subtraction from the quantity R stored in the R-register 11. The determination of whether the output of the adder 13 is to be added to or subtracted from R is provided by the other input to the gate 16, $dX$. This determination may be provided in numerous ways, but for the purpose of the present explanation it will be assumed that the quantity appearing as $dX$ may take on one of three possible values at any time. One of these values determines that the sum will be added to R, the other determines that the sum will be subtracted from R, and the third determines that R will be left unchanged. This process of addition or subtraction is carried out by the adder 18 connected to the R-register 11. The resulting sum from the adder 18 is returned, under certain conditions to be described later, to form the new value of R. The adder 18 is also equipped with circuitry to determine whether the limits of the numbers which may be stored in the R-register 11 have been exceeded in either a positive or negative sense. If they have, a signal $dZ$ is generated on the overflow output lead 19. This signal, like $dX$, may take on one of three values indicating 1) overflow in the positive sense; 2) overflow in the negative sense; and 3) no overflow. The $dY$ increment 14 may also take on one of three values indicating 1) a positive change in Y; 2) a negative change in Y; and 3) no change in Y.

In the following explanations specific components and circuits are disclosed for performing the functions hereinbelow described. It is to be appreciated that equivalent components and circuit configurations for performing equivalent functions may be utilized to the same effect.

First it will be assumed that the representation of quantities in the DDA is by means of a fractional binary system of numbers. Whole numbers, such as Y and R, will be assumed to be represented by $n$-bit numbers and $|Y| \leq 1$, $|R| < 1$. Incremental quantities $dX$ and $dZ$ will be assumed to have unit or zero magnitude and positive or negative sense. Incremental quantity $dY$ will be assumed to have magnitude $2^{1S}$ where S is a positive integer or zero. The method of determination of S will be discussed later.

The numerical operations performed by an integrator during a single updating cycle are best described using the Iverson notation. These are $$Y \leftarrow Y+dY$$

$$dZ \leftarrow \lfloor YdX + R \rfloor$$

$R \leftarrow YdX+R-dZ$ (By way of explanation: $A \leftarrow \lfloor B \rfloor$ is read "$A$ is replaced by the 'floor' of $B$," and means that the quantity which is represented by $A$ is now made equal to the greatest integer which is less than or equal to the quantity which is represented by $B$.) Note that if $R$ is initially equal to or greater than zero, the operations above limits its value to remaining equal to or greater than zero at the end of each updating cycle. Thus, once $R$ has been fixed as a positive number, it must always remain positive.

These operations provide approximations to the continuous processes $$Y = \int dy$$

and $dz = ydx$ The quality of the approximation is set by the fineness quantization of $y$, $dx$, and $dz$.

Figure 2:
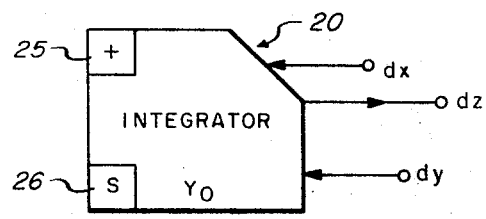
FIG. 2 is a block representation of the integrator of FIG. 1.

FIG. 2 shows a block representation of the integrator 20 of FIG. 1. Its inputs $dY$, $dX$ and output $dZ$ correspond to similar inputs $dY$, $dX$ and output $dZ$ in FIG. 1. The initial value that is stored in the Y-register 10 of FIG. 1 is shown as $Y_o$ in FIG. 2. The sense or polarity of the integrator 20 is shown in the box 25 at the upper left corner. If $+$ is written here the integrator function is $$dz=ydx$$

whereas if $-$ is written, the function is $$dz=-ydx$$

The integrator scale is shown in the box 26 at the lower left corner of the integrator 20. Although only a single $dY$-input is shown, the usual practice is to allow at least two.

The use of DDA-integrators will now be illustrated by demonstrating their connection to provide solution to the simple differential equation $$y''(x)+W^2y(x)=0$$
$$y'(0)=0$$
$$y(0)=-1/W$$
$$W = \text{constant}$$

To aid solution, the equation is first written in differential form $$dy''=-W^2ydx$$

and also the relationship $$dy=y''dx$$

is listed.

The integrator equations may then be written:

$$dy''=-W^2du$$
$$du=ydx$$
$$dy=y''dx$$

Figure 3:
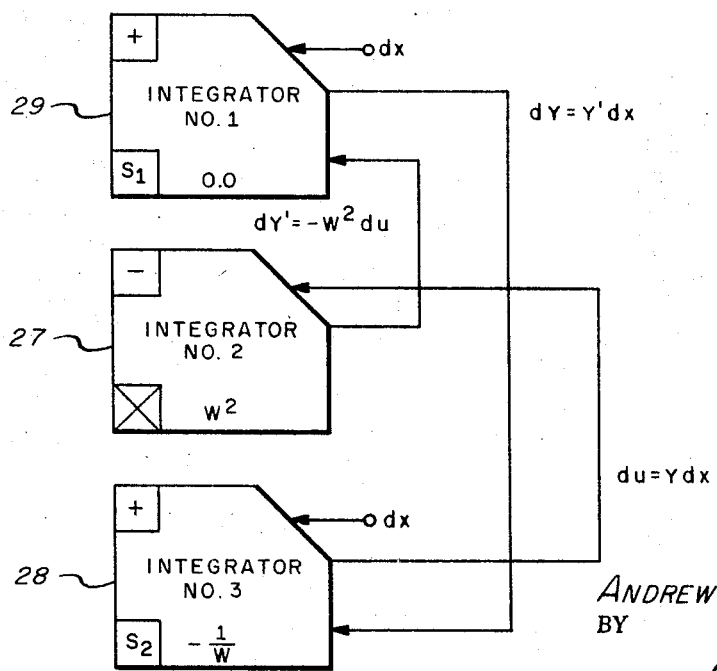
FIG. 3 is a schematic diagram showing three DDA-integrators interconnected to solve a particular differential equation.

These three three equations are mechanized as shown in FIG. 3 by the three integrators 27, 28, and 29. The integrator 27 which mechanizes the first equation is used as a constant multiplier and therefore requires no $dY$-input. It therefore also requires no specification of scale.

The methods of scaling DDA-integrators to affect the proper ratios between the magnitudes of machine variables and problem variables is well known and does not require explanation. The scaling of an individual integrator, however, is of concern. This scaling sets the relationship between the magnitude of the $dY$-input and the magnitude of the maximum content of the Y-register 10. As stated before, the Y-register 10 is assumed to be capable of storing a fractional quantity whose maximum magnitude is unity. If $2^S$ $dY$-increments are required to drive the Y-register contents from zero to maximum (unity) then the effective magnitude of $dy$ is $2^{-1S}$. In practice the $dY$-inputs are often $dZ$-outputs of other integrators. These outputs have assumed unit magnitude so that an effective scaling down is introduced between the $dZ$-output of one integrator and the $dY$-input of another. The scale is indicated by the value S in the box 26 established in the integrator 20. How this is accomplished will be discussed in greater detail after an appropriate system for numerical representation has been explained.

The form of numerical representation of whole numbers assumed both in this discussion and during the exposition of the preferred embodiment is the so-called "two's complement" fractional binary system. This system is explained with reference to FIG. 4. This figure contains a number circle 30 which indicates the mapping of rational fractions 31 onto their fractional binary equivalents 32. Since the values of the numbers represented are not greater in magnitude than unity, all magnitude information is contained by the digits to the right of the binary point. The problem in any binary system occurs in the representation of negative values. In the two's complement system negatives are represented by a reflection about the axis of magnitude symmetry. To obtain the negative of a given number in binary representation, it is necessary to reflect its digits about the axis of binary symmetry 34 and then increment it by one unit in the positive direction 35. The two's complement system is particularly useful in serial computations. There, processes (additions or subtractions) which cause the value of a variable to shift from one side of the axis of magnitude symmetry 33 to the other can be completed by a single serial pass through the digits of the variable. This is not the case in the other standard representation, the one's complement system. The disadvantage of the two's complement method is the difficulty of forming negatives of a given value. It is seen that the sign of the assumed binary representation is given by the digit to the left of the binary point. If this digit is zero, the number is positive, whereas if it is unity, the number is negative.

The assumed representation of increments throughout the following will be in the two digit ternary form. This means that two binary digits (bits) are required for total representation of an increment. The rightmost bit represents the magnitude and the leftmost the sign. A convenient choice is to let a magnitude bit representation of "1" indicate unit magnitude and "0" indicate zero magnitude. A sign bit representation of "0" indicates positive sign and of "1" indicates negative sign.

Referring to FIG. 1 again, the addition of a Y-register 10 to an R-register 11 under control of $dX$ may be in a variety of ways. One method is to make use of an adder-subtractor in place of the adder 18 and to allow the choice of addition or subtraction to be controlled by the sign of $dX$. Another method is to use only an adder 18 and then cause the negative of the numeric input from the adder 13 to the gate 16 to be formed if $dX$ is negative. This latter method will be assumed here. When the addition of the contents of the Y-register to those of the R-register is controlled by $dX$ in this way, the gate 16 joining the Y-register to the adder 18 may be thought of as a multiplier which forms the algebraic product of Y and $dX$. A number of different ways of mechanizing this Y-$dX$ multiplication are feasible. One of these is shown in FIG. 5. To form the negative of a number in two's complement notation, it is necessary to form the bit-by-bit logical inverse (reflect about the axis of binary symmetry 34) and then increment by one unit in the column of the least significant bit. This is shown by the example below:

| Decimal | Binary | Logical inverse | Two's complement (negative) |
|---------|--------|-----------------|------------------------------|
| +22/32  | 0.10110 | 1.01001         | 1.01010                      |

It can be shown that the process of forming the two's complement negative representation of a binary number may be carried out sequentially by leaving the bits of the number unchanged, starting with the least significant, to and including the first ONE, and then replacing the remaining bits by their inverses (ONE's by ZERO's and vice versa). This is what is done by the Y-$dX$ multiplier 37 in dThe quantity Y is introduced serially, least significant bit first, into the input terminal 39 of the Y-$dX$ multiplier 37. The logical inverse $\bar{Y}$ of each bit is formed by an inverting circuit 41. The noninverted quantity $\bar{Y}$ serves as one input to an AND gate 42. The inverted quantity Y serves as one input to another AND gate 43. The other inputs to these AND gates are the control signals A and its inverse $\bar{A}$ which are outputs of a flip-flop 46. The outputs of the two AND 42 and 43 gates serve as inputs to an OR gate 47. The combination of AND gates 42 and 43, and OR gate 47 provides a selection of Y or its inverse $\bar{Y}$, conditional upon the state of the flip-flop 46. The flip-flop 46 is normally in the reset state so that Y is selected, but if the sign of $dX$ which is applied to one input terminal 49 of AND gate 50 is negative then AND gate 50 is enabled. The other input to this AND gate is Y, itself, so that the arrival of the first ONE in Y causes the flip-flop 46 to be set and causes the inverse $\bar{Y}$ to be selected as the output of OR gate 47 The effect of this operation is to form the proper two's complement negative of Y when $dX$ is negative. An AND gate 48 is connected to the output of the OR gate 47 and allows the final output of the Y-$dX$ multiplier to be gated by the magnitude of $dX$ and $\bar{S}$ (the inverse of the start pulse provided by FIG. 8) which are applied to other input terminals 51 and 45 respectively of the AND gate 48. Thus, when $dX$ is of unit magnitude and S=0, the output of the OR gate 47 appears at the output terminal 52 of the Y-$dX$ multiplier 37, whereas when $dX$ is of zero magnitude, the output is zero. Since Y is a serial binary number, the quantity $dX$ must be present and unchanged throughout the entire word time required for sequencing the bits of Y.

Figure 4:
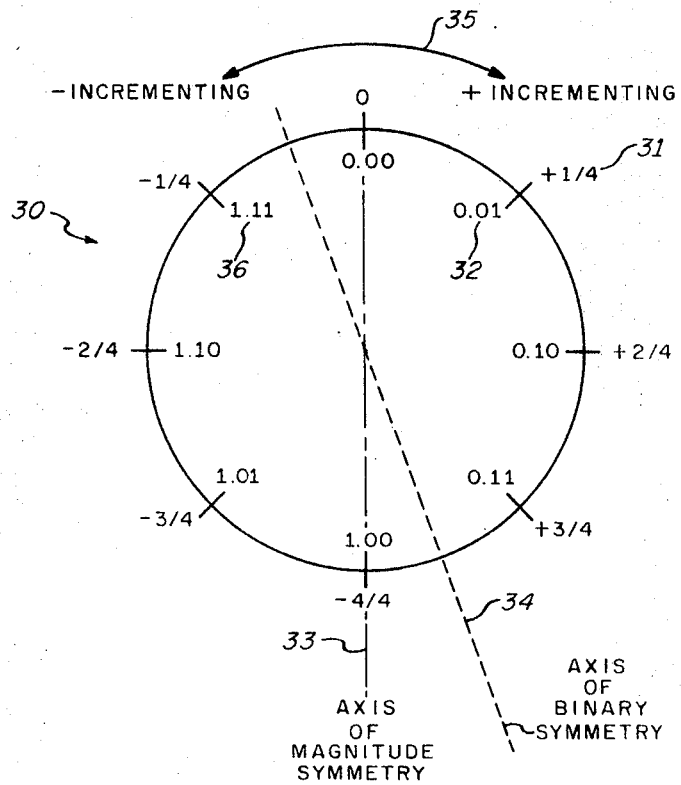
FIG. 4 is a graphical presentation of the two's complement fractional binary system.

The generation of the sum, Y$dX$ +R, and of $dZ$ will be explained with reference to FIG. 6 which shows one of the possible logic configurations for a serial binary adder, 53, with additional logical circuits 54, 55, and 56, added to specialize it for $dZ$ and $R'$ generation (as required in a DDA.) It will be recalled that the value contained in the R-register 11 is restricted to positive or zero values. Referring to FIG. 4, it may be seen that this is equivalent to restricting R to values to the right of the axis of binary symmetry 34. Any addition of Y$dX$ to R which causes the resulting new value of R to cross the axis of binary symmetry may be considered as causing an overflow (or underflow) in R which may be interpreted as the necessary condition for unit magnitude in $dZ$. The sense of the overflow is determined by the direction of crossing of the axis of binary symmetry, positive for clockwise crossing and negative for counterclockwise crossing. The correct new value of R is determined by forcing the sign of R to be positive (zero), which is equivalent to the subtraction of $dZ$ in the third replacement function described above. Thus the magnitude of $dZ$ is ascertained by sampling the sign bit of the sum R+Y$dX$ before forcing the sign bit to zero, and the sign of $dZ$ is ascertained by sampling the sign of Y$dX$, since a negative Y$dX$ can only cause negative overflow and positive Y$dX$ can only cause positive overflow.

The serial adder 53 receives serial binary inputs Y$dX$ and R at input terminals 57 and 58, respectively and produces the serial binary sum Y$dX$ +R at the output of OR gate 59. This quantity is sampled by causing a pulse at sign-bit time, $B_s$ 60, to control AND gate 55 producing the magnitude of $dZ$. The sign of Y$dX$ is sampled at sign-bit time via AND gate 54 to produce the sign of $dZ$. The new value of R, i.e., $R'$, is generated by passing the output of OR gate 59, except at sign-bit time, via AND gate 56. The control input to AND gate 56 is the inverse of $B_s$, i.e., $\bar{B}_s$ applied via input terminal 61. The sign of $dZ$ and the magnitude of $dZ$ appearing at the output terminals 63 and 64, respectively, are transmitted to flip-flop holding circuits (not shown) which cause their states to be stored for the next full word period.

The preferred embodiment of a programmable DDA integrator 40 in accordance with the present invention will be described next, with reference to FIG. 7. The integrator 40 contains an arithmetic section which is essentially the same as the integrator shown in FIG. 1. This comprises an R-register 65, a Y-register 66, their associated serial adders 67 and 68 and a Y-$dX$ multiplier 37 which may be of the type shown in FIG. 5. In addition, the arithmetic section contains a $dY$-counter 69 which accumulates positive and negative increments in Y, a start-pulse detector 71 which determines at which point during the Y-word cycle to commence the addition of $dY$ to Y, and a $dY$-register 70 which is a shift register that sequences the bits of $dY$ into the serial adder 68 during the addition of $dY$ to Y.

Besides the arithmetic section, the programmable integrator 40 contains a programming section which stores, in binary form, information indicating the connections implies between the integrator and other integrators in a system, and an initializing section which selectively connects both arithmetic and interconnection storing registers to an initial condition bus 74 over which binary information is transmitted to the various integrators to configure them correctly before a solution is commenced. The programming section comprises an LX-register 72 which stores the information indicating the source (such as output of another integrator, input to the system, or constant rate pulse source) of the single $dX$-input to the integrator, an LY-register 73 which stores information indicating the sources of the $dY$-inputs (if any) to the integrator 40, and various gates 74, 75, and 77, which cause incremental inputs and the output to be gated from and to the data bus 78 at appropriate times as determined by the LX, and LY registers or the integrator bit-pulse source $B_l$ which enters at input terminal 79 to the gate 74. Also, there is a gate 76 which gates integrator sign information which is also stored in the LY-register 73.

The initializing section comprises an initialization decoder 80 and the four loading gates 81, 82, 83 and 84.

During problem solution, two sequences of operations alternate. The first sequence is devoted to arithmetic operations and the second to transmission of input and output information (via multiplexing on the data bus 78) among the several integrators in a system. During the first sequence, which is called "compute time," accumulated $dY$-increments are added to the contents of the Y-register 66 to form the new value of Y, the new value of Y is multiplied by $dX$ and the product Y$dX$ is added to the contents of the R-register 65 to form both the new value of R (the sum) and $dZ$ (the over flow). At the end of this sequence $dZ$ is stored in the $dZ$-store 85. The second sequence is called "connect time." During this period the $dZ$ value from the $dZ$-store 85 is gated onto the data but 78 at the integrator time determined by $B_l$, incoming $dY$ pulses are collected and accumulated by allowing the coincidence of pulses on the data bus 78 and pulses exiting the LY-register 73 to enable a $dY$-gate 77 which in turn increments (or decrements) the $dY$-counter 69, the single $dX$-input is obtained by allowing the coincidence of pulses on the data bus 78 with the pulse emerging from the LX-register 72 to set (via a $dX$ gate 75) the $dX$-store 85, and the sign factor of the integrator is stored in the $dZ$-store 85 by scanning the sign factor bit $B_s$ (also stored in the LY-register 73) at sign time via gate 76. It is convenient, although not necessary, to cause the compute time and the connect time each to last for one serial word period.

A more detailed description of the formation and operation of the preferred embodiment of the programmable DDA-integrator now follows. The addition of correctly scaled $dY$-increments to Y will be explained first. As mentioned above, the scale of $dY$ (i.e., the effective ratio of the magnitudes of the maximum number that may be stored in the Y-register 66 to that of a single increment in $dY$) is determined by the bit location in the Y-register 66 where a single increment in $dY$ is added during updating of Y. Since the $dY$-counter 69 may accumulate several increments in Y during any updating cycle, the scale is controlled by the position in the Y-register 66 where the addition of $dY$ commences. This position is determined by the location of the lowest order ONE in the Y-register 66. This lowest order ONE, called the "start pulse," is inserted into the Y-register 66 as an initial condition and is left unchanged throughout ensuing computations by allowing $dY$-increments to be added to Y starting at the next higher order bit position than the start pulse. In operation, the start pulse is detected by the start pulse detector 71, in a manner to be explained with respect to FIG. 8, which in turn causes a parallel transfer of the contents of the $dY$-counter 69, via parallel gates 86, to the continuously shifting $dY$-shift register 70. Wen the $dY$-shift register 70 receives a parallel input, it immediately shifts it out, least significant bit first, to the serial adder 68, for addition to the old value of Y.

Figure 8:
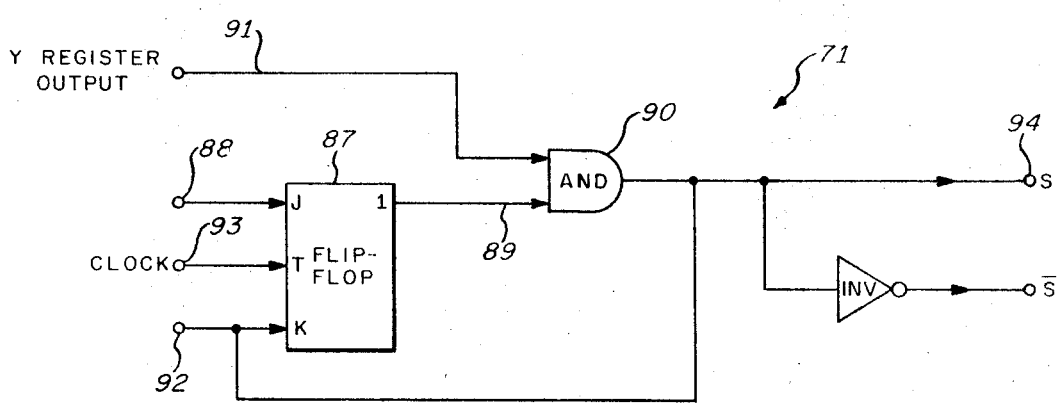
FIG. 8 is a schematic diagram of a start pulse detector.

The operation of one possible embodiment of the start pulse detector 71 will be explained with reference to FIG. 8. A J—K flip-flop 87 is set at the end of the connect time, by $B_s$ appearing at input terminal 88, so that its assertive output via lead 89 is enabled. This provides one condition for the enabling of AND gate 90. The other condition for enabling the AND gate 90 is provided by the reception of a ONE from the Y-register 66 on input line 91. When this ONE is received, a pulse (ONE) is generated at the output of AND gate 90. Since this is the first pulse received from the Y-register 66 during the compute time, it is the start pulse S and appears at output terminal 94. The occurrence of a ONE at the output of the AND gate 90 causes a reset to be applied at the negating input terminal 92 of the flip-flop 87, which, at the occurrence of a clock pulse appearing at input terminal 93, causes the assertive output on lead 89 to be disabled. This, in turn, removes the enabling condition from input lead 89 of AND gate 90 and allows it to pass no further pulses from the Y-register 66. Thus, the start pulse detector 71 has been shown capable of detecting and transmitting the first and only the first ONE emerging from the Y-register 66.

Figure 9:
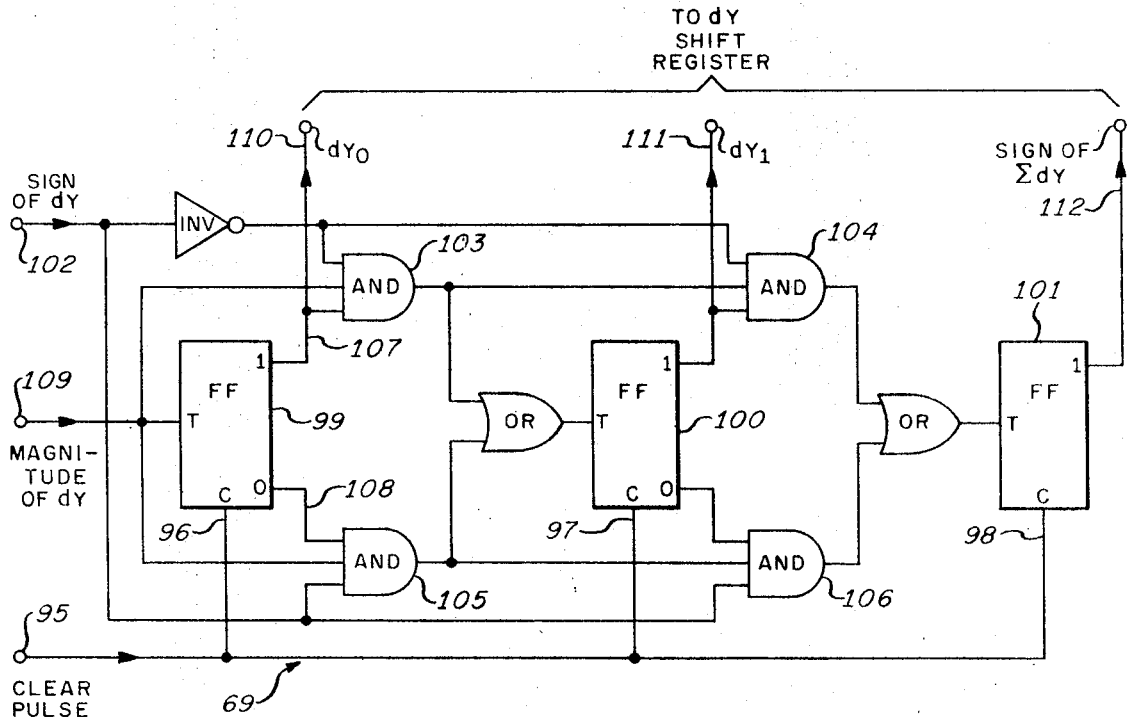
FIG. 9 is a schematic diagram of a $dY$-counter.

The $dY$-counter 69 is a conventional up-down counter which may be of the type shown in FIG. 9. Individual increments in $dY$ are represented by two bits, a magnitude bit and a sign bit. The convention adopted here is that unit magnitude is represented by ONE and negative sign is represented by ONE. The $dY$-counter 69 shown is capable of accumulating positive or negative counts of up to three increments. Its operation is based on the fact that to increment a two's complement binary number positively, all successive ONE's and the first ZERO, starting with the low-order bit, are inverted, whereas to increment a two's complement binary number negatively, all successive ZERO's and the first ONE are inverted. The $dY$-counter 69 is started in the cleared state (all ZERO's) by applying a clear pulse via terminal 95 to the clearing inputs 96, 97 and 98 of the counter flip-flops 99, 100, and 101, which sets them to ZERO. The clear pulse may be the sign bit pulse associated with the end of compute time. The sign of each $dY$-increment that is received via input terminal 102, if positive (ZERO) causes one of the inputs of AND gates 103, 104 to be enabled, whereas if negative (ONE) causes one of the inputs of AND gates 105, 106 to be enabled. The second enabling input to each of the AND gates 103, 104, 105, 106 is either the assertive output such as that appearing on lead 107 or the negating output such as that appearing on lead 108 of one of the flip-flops 99, 100, 101. The signal representing the magnitude of the current $dY$-increment appearing at input terminal 109 is used as the trigger to the $dY$-counter 69. This pulse, when ONE, changes the state of the first flip-flop 99 and also serves as the third enabling input to AND gates 103 and 105. Thus one of these AND gates will be enabled if the magnitude of the incoming $dY$-increment is ONE, the selection of which one being made by the flip-flop 99. The action caused by the unit $dY$-magnitude pulse will propagate down the chain of all connected AND gates which are fully enabled and may be seen to provide the triggering conditions necessary for the aforementioned up-down counting action. The bits of the accumulated net value of the quantity to be added to Y appear at the assertive outputs of the flip-flops simultaneously. The least significant bit appears as $dY_0$ at output terminal 110, the next bit appears as $dY_1$ at output terminal 111 and the sign of the accumulated quantity $\Sigma dY$ appears at output terminal 112. (Note that the operation of the flip-flops in this counter is in the triggered mode such that a ONE input to the T-terminal of a flip-flop causes it to change state).

Figure 10:
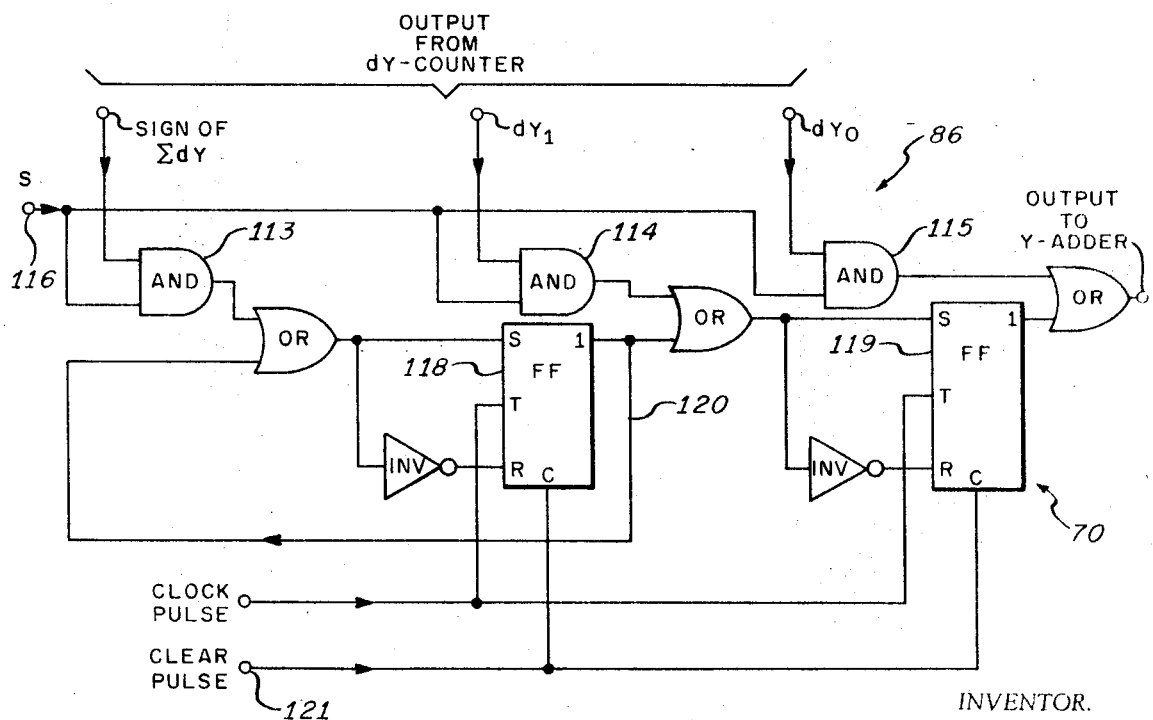
FIG. 10 is a schematic diagram of a $dY$-shift register and its associated gates.

The $dY$-shift register 70 and parallel gate 86 are shown in FIG. 10. The parallel gate comprises (in this case) three AND gates 113, 114, and 115, which, upon command by the start pulse, S appearing at input terminal 116 causes the output of the $dY$-counter 69 to be transferred in parallel into the previously cleared $dY$-shift register 70. The $dY$-shift register 70 comprises (in this case) two flip-flops 118 and 119. The function of the $dY$-shift register 70 is to convert the accumulated $dY$-quantity to a form compatible with the number in the Y-register 66, and to shift the $dY$-quantity into the serial adder 68 associated with the Y-register 66. The conversion entails an extension of the sign bit of $\Sigma dY$ over all bit positions from its original location in the $dY$-shift register 70 up to and including the position corresponding to the sign bit position in the Y-register 66. For instance, if $\Sigma dY$ is represented by three bits and has the value of one negative increment, its representation in the $dY$-counter 69 and shift register 70 will be (111). If the Y-register 66 is eight bits long and the scaling is such that the lowest order bit position of $\Sigma dY$ is to be added to the contents of Y-register 66 at the seventh position of Y (start pulse 08), the necessary form for $\Sigma dY$ is (1111111). Under the same conditions, if $\Sigma dY$ has the value of one positive increment, i.e., $\Sigma dY =$ (001), the necessary form for addition of $\Sigma dY$ is (0000001). The required extension of the sign bit is accomplished in the $dY$-shift register 66 by providing a feedback path 120 from the assertive output of the flip-flop 18 which stores the sign bit of $\Sigma dY$. In this way, if the sign bit is originally ZERO, a ZERO is continually fed back, whereas if it is ONE, a ONE is fed back. The sign flip-flop 118 thereby remains in a given state until it is cleared. Clearing of both flip-flops 118 and 119 is accomplished by a clear pulse appearing at input terminal 121 which may be coincident with the end of $B_s$ at compute time.

Figure 7:
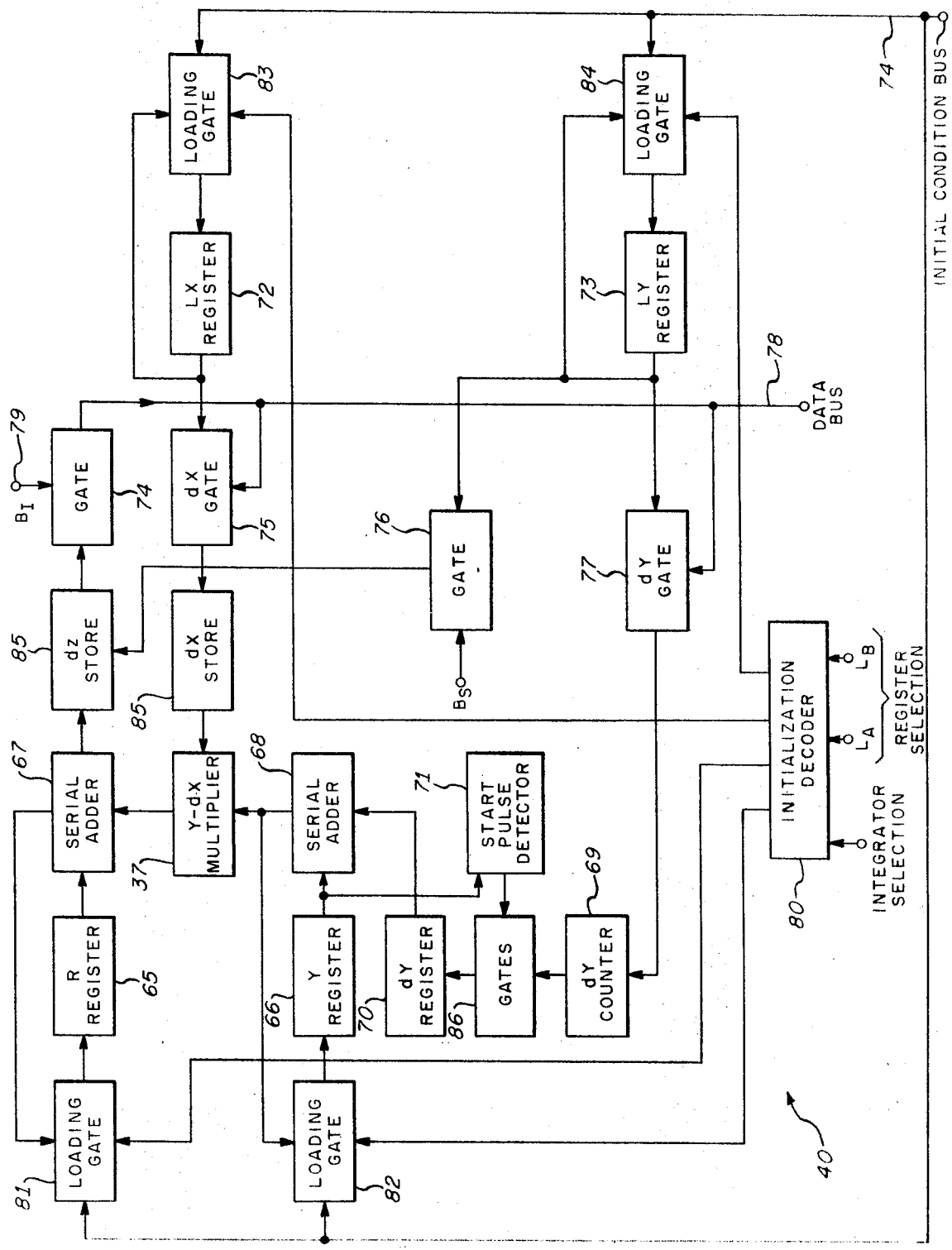
FIG. 7 is a schematic block diagram of a programmable DDA-integrator.
Figure 11:
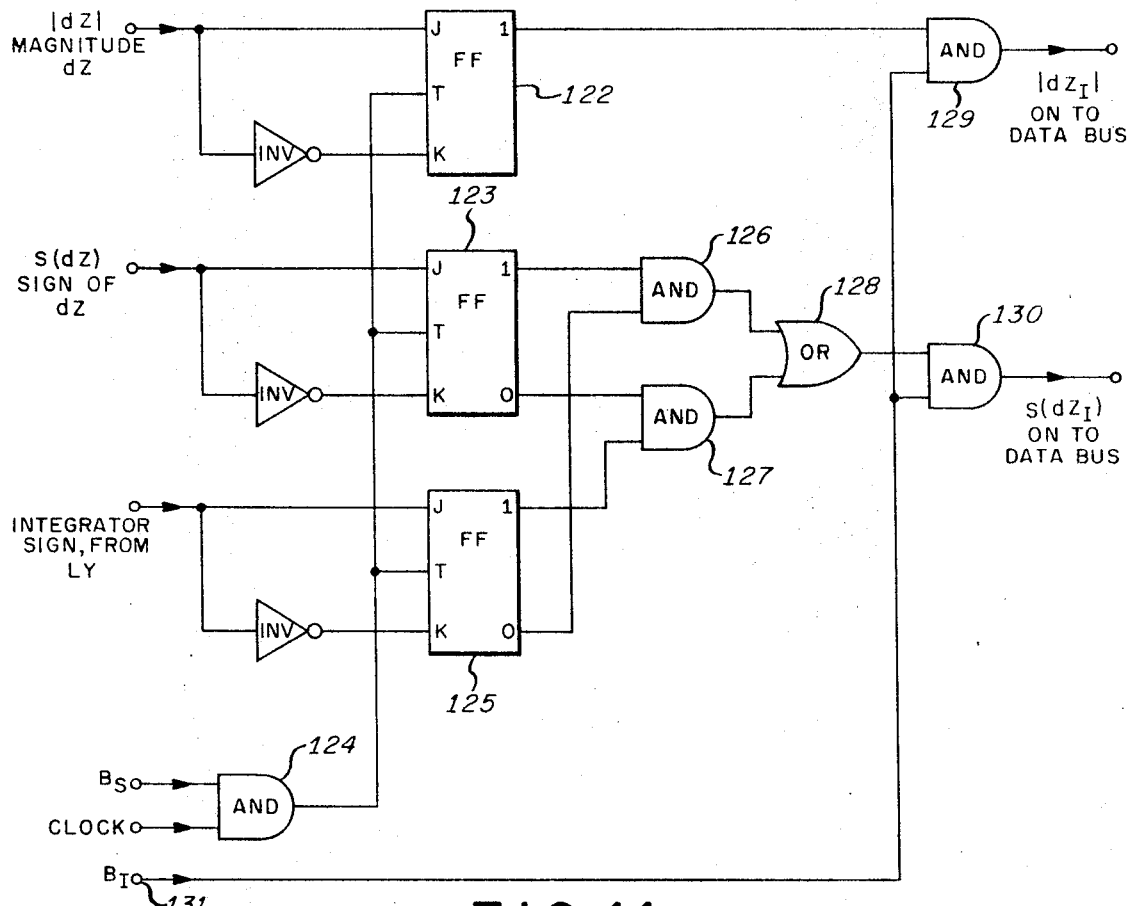
FIG. 11 is a schematic diagram of a $dZ$-store circuit as well as integrator sign and $dZ$-gates.

The operation of the $dZ$-store, integrator sign gate and $dZ$-gate, shown as 85, 76 and 74, respectively, in FIG. 7, is explained next, with reference to FIG. 11. The function of the $dZ$-store 85 is to sample the magnitude and sign of $dZ$ (output of serial adder 67 at sign time) and to hold these values for the next word cycle, during which time they are connected to the data bus 78 at the bit time corresponding to the integrator number. The magnitude of $dZ$ and the sign of $dZ$ are delivered as inputs to two flip-flops 122 and 123. These flip-flops are triggered by a pulse, formed by an AND gate 124, which occurs as s single clock pulse during $B_n$, the sign bit time of the compute period. Thus, only inputs occurring at $B_s$ time are transferred into the flip-flops, and these values remain until new inputs are gated in. The integrator sign is stored at the position corresponding to $B_s$ in the LY-register 73. The function of the integrator sign bit is to cause inversion of the sign of the $dZ$-output if and only if the integrator sign bit is ONE (representing a negative transfer function for the integrator). The output of the LY-register 73 is transmitted and inverted to form J and K inputs to another flip-flop 125. By combining outputs of the $dZ$-sign flip-flop 123 and the integrator sign flip-flop 125, via AND gates 126 and 127 and an OR gate 128, the choice of the original or inverted value of the sign of $dZ$ is conditioned by the values of integrator sign ZERO or ONE, respectively.

The outputs of the $d$ Z-magnitude-storing flip-flop 122 and the stored sign of $dZ$ (from OR gate 128) are delivered as inputs to AND gates 129 and 130, respectively, which together constitute the $dZ$-gate 74. The other input to each of these AND gates is the integrator bit time pulse, $B_t$ appearing on input terminal 131. This pulse, which is at a different time for each integrator, occurs, during the connect time, at the bit time corresponding to the number assigned to the integrator. In this way the magnitude and sign of $dZ$ for a particular integrator are gated onto the data bus at the integrator bit time of connect time. It should be noted that the data bus, in this mechanization, comprises two wires, one for magnitudes and one for signs.

Figure 12:
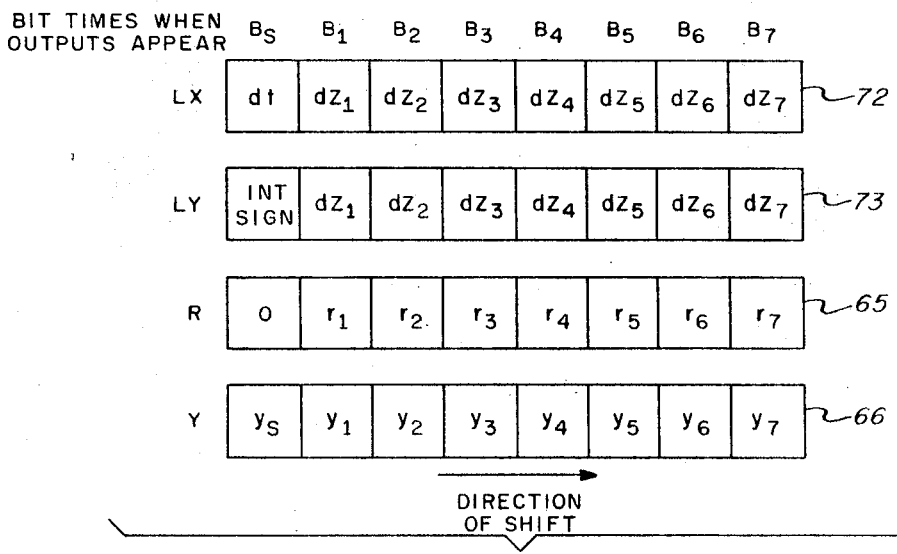
FIG. 12 is a table showing the organization of the storage registers.

The organization of the LX-and LY-registers 72 and 73, respectively, is explained with reference to FIG. 12. These registers are conventional shift registers. At the start of either a compute cycle or connect cycle (reference position) their contents are as shown in FIG. 12. The significance of a ONE stored in a particular location of either of these registers will be explained further. Assume that a ONE is stored in the cell of the LX-register 72 which is labeled "$dZ_4$." This ONE will appear as an output of the LX-register at bit time four ($B_4$) of both the compute and connect cycles. The action implied is that the $dZ$-output of integrator number four is to be taken as the $dX$-input to the integrator which contains the LX-register under discussion. Integrator number four gates its $dZ$-output onto the data but 78 at the time $B_4$ of the connect cycle. Thus, the arrival of a nonzero increment on the data bust 78 and the output of a ONE from the LX-register 72, both at $B_4$, constitute the conditions necessary and sufficient for a nonzero $dX$-input to the integrator in question. The contents of the LY-register 73 determine, in the same way, the sources of the $dY$-inputs.

In the example under discussion, a register length of eight positions is assumed. This means that up to seven different integrators may be connected to the same data bus. The eighth position of the LX-register 72 is marked "$d$." The $dt$-increment is a positively-signed, unit magnitude pulse train which is transmitted over the data bus during $B_s$ of the connect cycle at the basic updating rate of the system. Its use as a $dX$-input is equivalent to specifying that the variable of integration is time. If $dY$, the differential in the integrand, is to be $dt$, it is necessary, in the present configuration, to use an additional integrator as a unity multiplier, with $dt$ as its $dX$-input. Its output then occurs at the same rate as $dt$ and may be connected as the $dY$-input of the particular integrator requiring $dt$ to be connected in this way. Another configuration for obtaining $dt$ as a $dY$-input will be discussed later.

Figure 13:
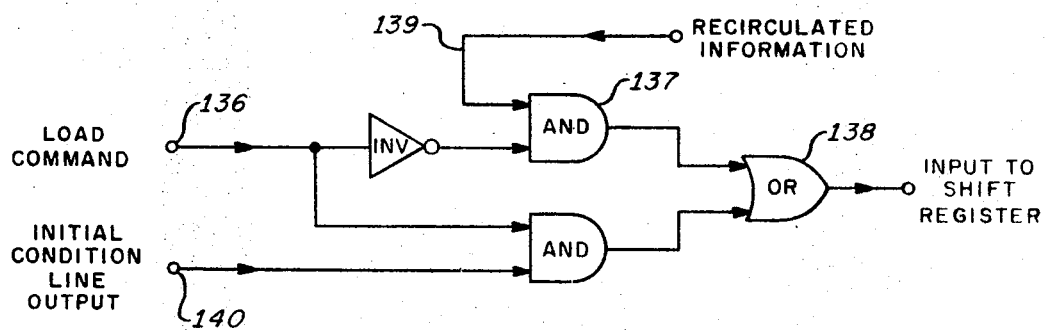
FIG. 13 is a schematic diagram of a loading gate.

The organization dthe LY-register 73 is dto that of the LX-register 72, with the exception that the integrator sign is indicated by the contents of the location which produces its output at $B_s$. Also, since an integrator may accumulate $dY$-inputs from a plurality of sources, it is possible to have more than one ONE entry in the locations corresponding to $dZ$-outputs of other (or the same) integrators. As shown in FIG. 7, both the LX-register 72 and the LY-register 73 are connected to recirculate their contents through respective loading gates 83 and 84. A loading gate is illustrated in FIG. 13. During normal computation, the load command line 136 is deactivated, which causes AND gate 137 and hence OR gate 138 to be responsive to only the recirculated information line 139. The outputs of the LX- and LY-register connect to the recirculated information lines of their respective loading gates so that the integrator interconnection information which each stores is continually recirculated in its original form. When it is desired to change this information, such as during an initializing period, the load command line 136 is activated, causing the OR gate 138 to be responsive only to the initial condition line 140. The recirculated information is then blocked and information on the initial condition line is delivered as input to the shift register.

The organization of the R-register 65 and Y-register 66 are shown in FIG. 12. In the eight-bit register length used for illustration, the bit which appears at the output at bit time $B_i, 1 \leq i \leq$ 7, represents the component of the number stored in the register which has weight $2^{i_1}$. In the Y-register 66 the bit which appears at $B_s$ represents the sign bit of the stored number. The bit in the R-register 65 which appears at $B_s$ is always ZERO since the sign of the R-register 65 is always positive. All registers shift their contents in the direction shown by the arrow.

Figure 14:
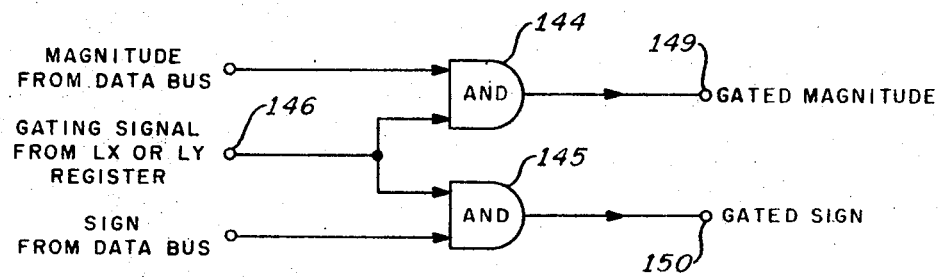
FIG. 14 is a schematic diagram of a $dX$ or $dY$ gate.

The $dX$ and $dY$ gates, 75 and 77 respectively, are detailed in FIG. 14. Each of these gates passes the magnitude and sign information transmitted on the data bus 78 when a ONE is received from its respective control register, LX or LY. Each gate consists of two AND gates 144 and 145, which share an enabling input from the control register via line 146 and have, as their other enabling input, the magnitude input from the data bus 78 and the sign input from the data but 78, respectively. The gated magnitude output on line 149 and the gated sign output on line 150 are transmitted to their respective destinations as shown in FIG. 7.

Figure 15:
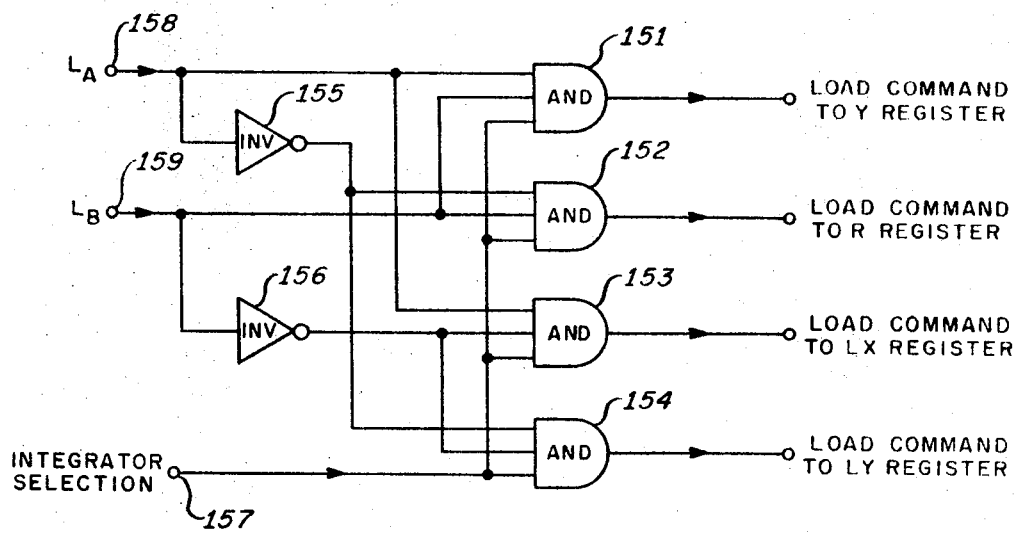
FIG. 15 is a schematic diagram of an initialization decoder.

The initialization decoder 80 shown in detail in FIG. 15, decodes the binary encoded commands to an integrator which cause one of its loading gates 81, 82, 83 and 84 in FIG. 7, to become enabled with respect to binary information existing on the initial condition bus 74. The initialization decoder 80, as shown, is a typical logic circuit consisting of AND gates 151, 152, 153, and 154, and inverters 155, 156 connected so that the activation of the integrator selection input on line 157 and some combination of the register address lines 158, 159 causes a load command to be sent to one of the loading gates 81, 82, 83, or 84 in FIG. 7. In the mechanization shown, each integrator in a system is assumed to receive its integrator selection command on line 157 from a different source so that no two integrators are receiving information from the initial condition bus 74 simultaneously. All integrators are connected to receive register address signals on lines 158 and 159 from the same two sources. The particular decoding realized by the circuit shown in FIG. 15 is shown below in table 1.

TABLE 1

| IS | $L_A$ | $L_B$ | Y | R | LX | LY |
|---|---|---|---|---|---|---|
| 0 | 0 | 0 | 0 | 0 | 0 | 0 |
| 0 | 0 | 1 | 0 | 0 | 0 | 0 |
| 0 | 1 | 0 | 0 | 0 | 0 | 0 |
| 0 | 1 | 1 | 0 | 0 | 0 | 0 |
| 1 | 0 | 0 | 0 | 0 | 0 | 1 |
| 1 | 0 | 1 | 0 | 1 | 0 | 0 |
| 1 | 1 | 0 | 0 | 0 | 1 | 0 |
| 1 | 1 | 1 | 1 | 0 | 0 | 0 |

In this table, IS is the integrator selection input on line 157 which must be activated to obtain loading of any of the registers in an integrator, $L_A$ and $L_B$ are the register address inputs on lines 158 and 159, and Y, R, LX, and LY are the enabling inputs to the Y, R, LX and LY-register loading gates, respectively.

Figure 16:
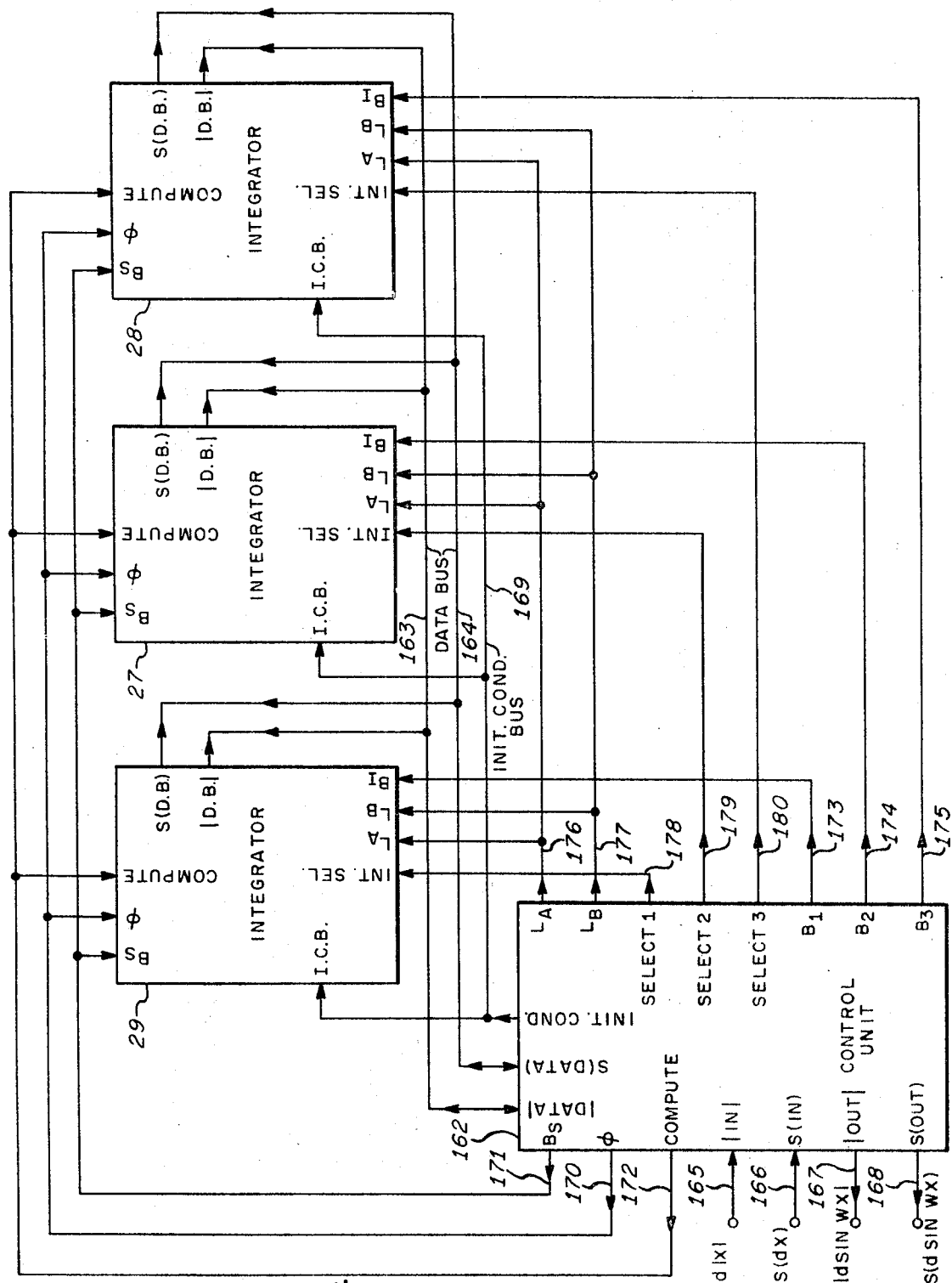
FIG. 16 is a schematic diagram showing the interconnection of the three programmable integrators of FIG. 3 in greater detail.

The interconnection of three programmable integrators 29, 27 and 28 to perform the sine-cosine computation described previously and illustrated in FIG. 3 is shown in greater detail in FIG. 16. In addition to the integrators, there is a control unit 162 which provides timing, initialization, and input-output connection to the integrators. A data bus 163, 164 connects to each of the integrators and to the control unit. The data bus comprises a data increment magnitude line ( |DATA| ) 163 and a data increment sign line ( S(DATA) ) 164, which distribute, respectively, the magnitudes and signs of the $dZ$-outputs and DDA-input increments among the various integrators and the control unit. The input to the DDA consists of the magnitude on line 165 and the sign on line 166 of the increment $dX$ which is placed on the data bus by the control unit 162 at a bit time not associated with the output of one of the three integrators. The output of the DDA is the magnitude on line 167 and the sign on line 168 of the increment $d(\text{sine } WX)$. This is the $dZ$-output of integrator 27 and is obtained by sampling, in the control unit 162, of the data bus at $B_2$. The DDA-output is stored in the control unit 162 for an updating cycle until the next output is ready.

Initial values and interconnection programs are also distributed from the control unit 162. These may either be stored within the control unit until they are to be used, utilizing a magnetic core storage or some other technique, or may be generated externally, in either encoded or direct form and processed in the control unit to obtain the correct sequencing for distribution to the integrators. The initial conditions and programmed interconnections are distributed via the initial condition bus 169. This is a single wire line.

The six basic timing pulses which must be generated by the control unit and transmitted to the integrators are $\phi$, $B_S$, COMPUTE, $B_1$, and $B_2$, $B_3$. Timing pulse $\phi$ on line 170 is the basic clock rate of the system. It activates the shift in the various registers and also clocks the arithmetic processes. COMPUTE on line 172 is the signal which, when ONE, Places the integrators in the compute cycle. When COMPUTE is ZERO, the integrators are placed in a connect cycle. The durations of the compute and connect cycles are one word time each. The other timing pulses and the commands associated with initialization on lines 176, 177, 178, 179 and 180, have been explained previously. When initialization is in progress, the inputs to the DDA and the $dt$ increment are withheld from the data bus, causing the integrators to suppress all activity and remain in a static condition with respect to arithmetic operations.

The setup of initial conditions and programmed interconnections for the sample system will be described after deriving the scaling for the solution. Assume that the $dx$-input to integrators 29 and 28 represents increments in real time and that each increment is equivalent to $2^{15}$ seconds. Furthermore, assume that W, the multiplier whose square is stored in integrator 27 is 0.75 rad/sec. If integrator scale factors S are defined as follows:

$$y=2^{S_Y}Y$$
$$dx=2^{S_X}dX$$
$$dz=2^{S_Z}dZ$$
$$dy=2^{S_{dY}}dY$$

in which the lower case quantities represent the physical variables and the capitalized quantities represent their machine representations, then the Y relation which must be satisfied for each integrator $$S_Y+S_X-S_Z \leq 0$$

The location of the start pulse, SP, is found for each integrator From $$SP=S_Y-S_{dY}+1$$

The final relationships required to allow scaling to be performed result from the requirement that an output from one integrator that is used as an input to another must have the same scale in both places, and that the maximum number which can be stored in a Y-register is unity. The scaling given by table 2 (below) satisfies the various constraints. Table 2 also shows the initial values to be stored in the Y-register.

TABLE 2

| I | $S_Y$ | $S_X$ | $S_Z$ | $S_{dY}$ | SP | $Y_0=2^{-S}Y$ |
|---|---|---|---|---|---|---|
| 1 | 1 | $-5$ | $\geq -4$ | $\geq -3$ | $\leq 5$ | 0 |
| 2 | 0 | $\geq -3$ | $\geq -3$ | X | X | 9/16 |
| 3 | 2 | $-5$ | $\geq -3$ | $\geq -4$ | $\leq 7$ | $-4/3 \times 2^{-2}$ |

Figures 17, 18:
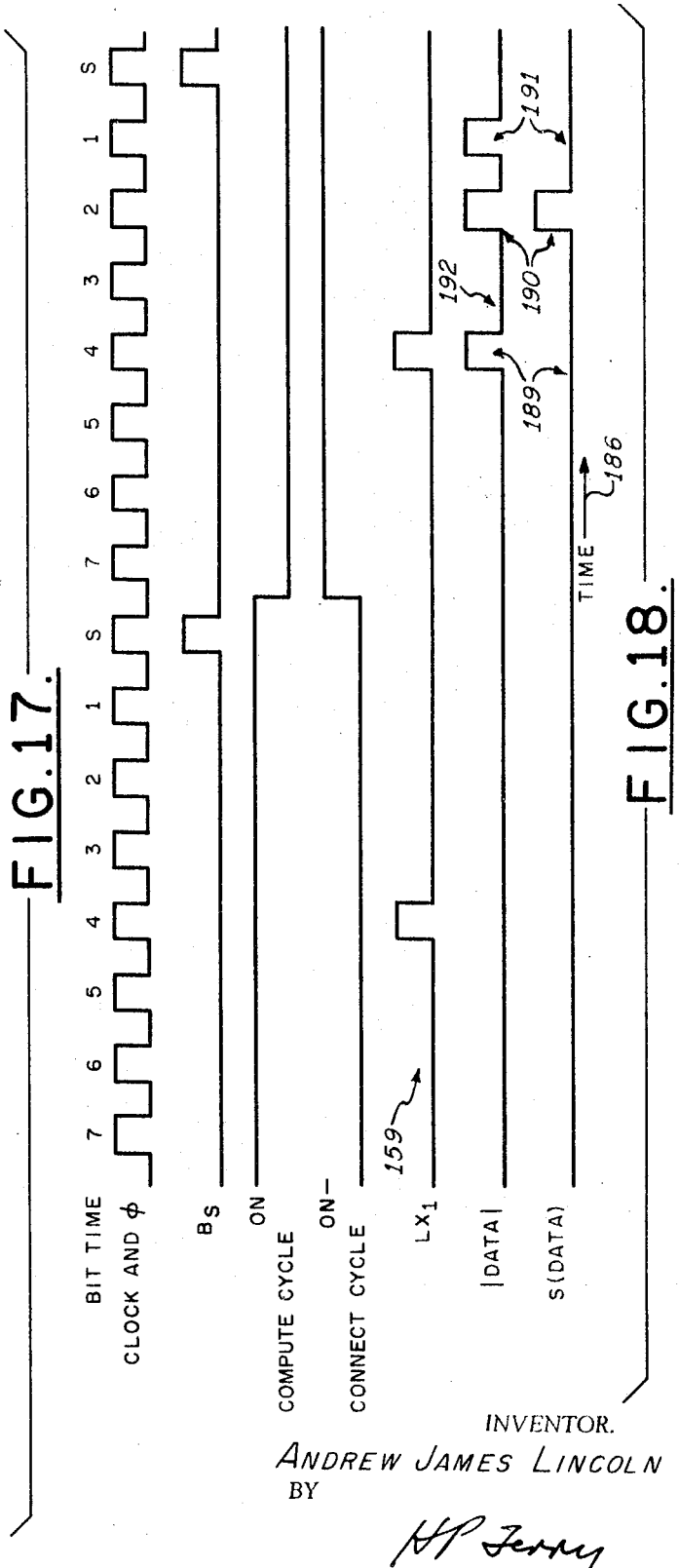
FIG. 17 is a table showing the initial contents of the registers for the sample problem.
FIG. 18 is a chart showing the relationships of the waveforms with respect to time.

The initial content of the various registers is shown in FIG. 17. In the example, the input increment $dx$ is assumed to appear on the data bus at bit time 4 ($B_4$) of the connection cycle. That is the reason for placing ONE's at $B_4$ in the LX-registers of integrators 29 and 28. The sign of integrator 27 is negative, as indicated by the ONE at $B_S$ of its LY-register. Since this integrator is used as a constant multiplier whose Y-value does not change, the negative sign could have also been represented by a ONE at $B_S$ of its Y-reister.

It is customary in DDA's to initialize the R-registers to one-half maximum vale to minimize round-off error as shown.

An example of timing such as might be used is shown in FIG. 18. The mapping of the time axis 186 is shown at the bottom of the diagram. The diagram shows one complete updating cycle, consisting of, first, a compute cycle, and then a connect cycle. The output 159 of the LX-register of integrator 29 is shown as well as the signals which would appear on the magnitude and sign lines of the data bus for a positive input increment of time 189, a negative output 190 from integrator 27, and a positive output 191 from integrator 29. Note that integrator 28 has no output 192 during this particular cycle.

An alternate method for representing the sign of an integrator is described next. Note that the sign bit of the R-register (193 in FIG. 12) is always ZERO in the embodiment described. If this storage storage location is used to store the sign of the integrator, then position $B_S$ of the LY-register can be used to denote the connection of $dt$ as a $dY$-input. The additional circuitry required to allow this alteration is merely a pair of gates which cause the output of the R-register at $B_S$ to be shunted around the arithmetic circuitry and the connection of the gate (76 in FIG. 7) to the output of the R-register instead of to the LY-register.

If the number of bits in each of the shift registers is $n$, then $n$-2 integrators may be joined by the common data bus 163, 164. Useful register lengths generally are about 20 to 26 bits so that 18 to 24 integrators may be joined in this fashion. This number may be expanded in several ways, the simplest of which conceptually is to increase the word length throughout. This generally is uneconomical. Another way is to increase the length of the L-registers 72 and 73 only and make the compute and connection cycles of unequal lengths.

Communication with a whole number computer may be provided by monitoring the increments on the data bus 163, 164 or by transmitting whole numbers serially back over the initial condition bus 169. The whole number computer may change values in the incremental section by transmitting new values to the desired integrator over the initial condition bus 169 during the connection cycle. The configuration of the integrator connections may also be altered by causing the whole number computer to send new information to the L-registers 72 and 73.

While the invention has been described in its preferred embodiments, it is to be understood that the words which have been used are words of description rather than limitation and that changes may be made without departing from the true scope and spirit of the invention in its broader aspects.

I claim:

1. A programmable digital differential analyzer integrator comprising means including first register means for registering first digital signals representative of variations in a dependent quantity of a mathematical function, multiplying means coupled to said means including first register means and adapted to receive second digital signals representative of variations in an independent quantity of a mathematical function for providing third digital signals representative of the product of the value currently registered in said first register means and said second digital signals, means including second register means coupled to said multiplying means for forming output signals upon the occurrence of a predetermined value in said second register means, said multiplying means being adapted to register said third digital signals in said second register means upon each occurrence of said second digital signal, programmable interconnecting means for selectively rendering said first and second register means and said multiplying means responsive to said signal representations, said programmable interconnecting means including storage, decoding and gating circuit means coupled to said first and second register means and said multiplying means for selectively changing the effective interconnections of said integrator by changing the information temporarily programmed therein, and in which all of said means are disposed on a common substrate.

2. A programmable digital differential analyzer integrator comprising means including first register means for registering first digital signals representative of variations in a dependent quantity of a mathematical function, multiplying means coupled to said means including first register means and adapted to receive second digital signals representative of variations in an independent quantity of a mathematical function for providing third digital signals representative of the product of the value currently registered in said first register means and said second digital signals, means including second register means coupled to said multiplying means for forming output signals upon the occurrence of a predetermined value in said second register means, said multiplying means being adapted to register said third digital signals in second register means upon each occurrence of said second digital signal, programmable interconnecting means for selectively rendering said first and second register means and said multiplying means responsive to said signal representations, said programmable interconnecting means including storage, decoding and gating circuit means coupled to said first and second register means and said multiplying means for selectively changing the effective interconnections of said integrator by changing the information temporarily programmed therein, and in which all of said means form a single monolithic semiconductor circuit.

3. A programmable digital differential analyzer integrator comprising means including first register means for registering first digital signals representative of variations in a dependent quantity of a mathematical function, multiplying means coupled to said means including first register means and adapted to receive second digital signals representative of variations in an independent quantity of a mathematical function for providing third digital signals representative of the product of the value currently registered in said first register means and said second digital signals, means including second register means coupled to said multiplying means for forming output signals upon the occurrence of a predetermined value in said second register means, said multiplying means being adapted to register said third digital signals in second register means upon each occurrence of said second digital signal, programmable interconnecting means for selectively rendering said first and second register means and said multiplying means responsive to said signal representations, said means including first register means including Y-register means for registering digital signal indications representative of said dependent quantity, $dY$-counter-register means for registering incremental variations of said dependent quantity, adding means coupled to receive said dependent quantity signal indications and said incremental variations thereof for providing said first digital signals representative of the sum thereof and for introducing said first digital signals into said Y-register means, said integrator further including gating means coupled between said $dY$-counter means and said adding means and responsive to a start signal for effecting said summation, and said programmable interconnecting means including a common input-output line adapted to be interconnected with other integrators, a common initiation line adapted to receive initiation signals, gating means coupled to said common lines, information storage means for storing initiation information coupled to at least a portion of said gating means and decoding means adapted to be responsive to address signals for selectively gating portions of said gating means for selectively rendering said signals effective.

4. A digital differential analyzer comprising a plurality of interconnected programmable digital differential analyzer integrators wherein each of said integrators includes means including first register means for registering first digital signals representative of variations in a dependent quantity of a mathematical function, multiplying means coupled to said means including first register means and adapted to receive second digital signals representative of variation in an independent quantity of a mathematical function for providing third digital signals representative of the product of the value currently registered in said first register means and said second digital signals, means including second register means coupled to said multiplying means for forming output signals upon the occurrence of a predetermined value in said second register means, said multiplying means being adapted to register said third digital signals in said second register means upon each occurrence of said second digital signals, common data bus means coupled to each of said integrators and responsive to data inputs and said output signals, gating means coupled between said common bus means and each of said integrators for selectively rendering said data inputs and outputs effective, and storage means coupled to at least a portion of said gating means for selectively actuating certain of said gating means as a function of stored information whereby interconnection between certain integrators is rendered effective.

5. A digital differential analyzer of the character recited in claim 4 and further including initial condition bus means adapted to receive initial condition signals representative of values to which certain of said register means and storage means are initially set and interconnection signals, loading gate means coupled between said initial condition bus means and said certain of said register means and storage means for selectively loading said certain register and storage means, and initialization decoding means adapted to receive externally generated selection signals and coupled to said loading gate means for selectively actuating at least a portion of said loading gate means.

6. A programmable digital differential analyzer comprising a plurality of digital differential analyzer integrator means each having an input and an output, common data bus means coupled to all said inputs and outputs, a plurality of first gating means coupled between said data bus means and the plurality of inputs, respectively, for selectively transmitting data signals from said data bus means to said inputs, a plurality of second gating means coupled between said data bus means and the plurality of outputs, respectively, for selectively transmitting data signals from said outputs to said data bus means, and programmable means coupled to said gating means for selectively rendering said gating means conductive.

7. A programmable digital differential analyzer of the character recited in claim 6 in which all of said means are disposed on a common substrate.

7. A programmable digital differential analyzer of the character recited in claim 6 in which all of said means form a single monolithic semiconductor circuit.

9. A programmable digital differential analyzer of the character recited in claim 6 further including a plurality of first storage means coupled between said first gating means and said inputs, respectively, for storing the data signals selectively transmitted from said data bus means through said first gating means.

10. A programmable digital differential analyzer of the character recited in claim 9 in which said plurality of second gating means are coupled to receive sequentially occuring gating signals, respectively, to sequentially render said second gating means conductive thereby sequentially transmitting data signals from said outputs of said respective integrators to said data bus means.

11. A programmable digital differential analyzer of the character recited in claim 10 in which said programmable means comprises a plurality of timing means coupled to said plurality of first gating means, respectively, for providing predetermined timing signals concurrently with said gating signals for selectively rendering said plurality of first gating means conductive, thereby effecting predetermined interconnections among said outputs and said inputs in accordance with said predetermined timing signals.

12. A programmable digital differential analyzer of the character recited in claim 11 in which each said timing means comprises shift register means for sequentially providing signals representative of the bits of a predetermined digital number stored therein, thereby providing said timing signals.

13. A programmable digital differential analyzer of the character recited in claim 12 in which said programmable means further includes means for changing said stored digital numbers thereby changing the effective interconnections among said integrators.

14. A programmable digital differential analyzer comprising
a plurality of digital differential analyzer integrator means each having a $dX$-input and a $dZ$-output certain of said integrator means having a $dY$-input,
common data bus means coupled to all said $dX$ and $dY$-inputs and all said $dZ$-outputs,
a plurality of first gating means coupled between said data bus means and the plurality of $dX$-inputs, respectively, for selectively transmitting data signals from aid data bus means to said $dX$-inputs,
a plurality of second gating means coupled between said data bus means and the plurality of $dZ$-inputs, respectively, for selectively transmitting data signals from said $dZ$-outputs to said data bus means,
third gating means coupled between said data bus means and the $dY$-inputs, respectively, for selectively transmitting signals from said data bus means to said $dY$-inputs, and
programmable means coupled to said gating means for selectively rendering said gating means conductive.

15. A programmable digital differential analyzer of the character recited in claim 14 further including
a plurality of first storage means coupled between said first gating means and said $dX$-inputs, respectively, for storing the data signals selectively transmitted from said data bus means through said gating means, and
second storage means coupled between said third gating means and said $dY$-inputs, respectively, for storing the data signals transmitted from said data bus means through said third gating means.

16. A programmable digital differential analyzer of the character recited in claim 15 in which said second storage means include means for accumulating said data signals transmitted through said third gating means.

17. A programmable digital differential analyzer of the character recited in claim 15 in which said plurality of second gating means are coupled to receive sequentially occurring gating signals, respectively, to sequentially render said second gating means conductive thereby sequentially transmitting data signals from said $dZ$-outputs of said respective integrators to said data bus means.

18. A programmable digital differential analyzer of the character recited in claim 17 in which said programmable means comprises a plurality of timing means coupled to said plurality of first and third gating means, respectively, for providing predetermined timing signals concurrently with said gating signals for selectively rendering said plurality of first and third gating means conductive, thereby effecting predetermined interconnections among said $dZ$-outputs and said $dX$ and $DY$-inputs in accordance with said predetermined timing signals.

19. A programmable digital differential analyzer of the character recited in claim 18 in which each said timing means comprises shift register means for sequentially providing signals representative of the bits of a predetermined digital number stored therein, thereby providing said timing signals.

20. A programmable digital differential analyzer of the character recited in claim 19 in which said programmable means further includes means for changing said stored digital numbers thereby changing the effective interconnections among said integrators.

21. A programmable digital differential analyzer of the character recited in claim 20 in which all of said means are disposed on a common substrate.

22. A programmable digital differential analyzer of the character recited in claim 20 in which all of said means form a single monolithic semiconductor circuit.